Patented Sept. 26, 1950

2,523,390

UNITED STATES PATENT OFFICE 2,523,390

TREATMENT OF CELLULOSE PROPIONATE

Walter D. Paist, Orange, N. J., assignor to Celanese Corporation of America, a corporation of Delaware No Drawing. Application November 29, 1946, Serial No. 713,111

4 Claims. (Cl. 260—230)

This invention relates to the treatment of cellulose propionate materials and relates more particularly to an improved process for the production of cellulose propionate materials yielding molded products which are highly resistant to blushing.

An object of this invention is to provide an improved process for the treatment of cellulose propionate materials which is adapted to effect the separation of the latter into fractions of different constitution and molecular weight.

Another object of this invention is to provide a process for the fractionation of cellulose propionate materials whereby said materials may be separated into distinct fractions in an efficient and economical manner and those fractions which are prone to blushing under conditions of high temperature and humidity may be removed.

Other objects of this invention will appear from the following detailed description.

Cellulose propionate is a valuable thermoplastic material and molded articles as well as films and foils having a basis of cellulose propionate are noted for their excellent physical properties. They are usually found to be tough, flexible and dimensionally stable, and possess, in addition, an excellent degree of water-resistance. One disadvantage which has been observed in certain shaped cellulose propionate materials is a tendency toward blushing or whitening when they are exposed to a combination of elevated temperature and high relative humidity. This blushing takes place regardless of the type and amount of plasticizer employed. While such blushing usually disappears when the conditions responsible therefor are removed, in most applications it is usually essential that cellulose propionate molded articles or cellulose propionate films or foils retain their original appearance regardless of humidity or temperature conditions.

I have now found that the blush-producing components in cellulose propionate materials may be removed therefrom by dissolving said cellulose propionate materials in a suitable solvent and fractionally precipitating the cellulose propionate from solution by adding a precipitant thereto. By carefully controlling the composition of the precipitant employed and the temperature at which the fractionation is effected, the undesirable blush-producing fractions may be separated therefrom and a purified cellulose propionate yielding films, foils and molded articles of superior blush-resistance as well as low color and high clarity may be obtained.

In accordance with my novel process, the fractionation of the cellulose propionate materials is effected by dissolving the cellulose propionate to be purified in a sufficient amount of acetone to form a solution containing about 10% by weight of the cellulose propionate and then precipitating the cellulose propionate therefrom in a plurality of distinct fractions by adding thereto controlled amounts of a precipitant comprising an aqueous solution of ethyl alcohol containing between 55 and 65% by volume of commercial 95% ethyl alcohol and 45 to 35% by volume of water. The above aqueous-alcoholic precipitant is preferably added to the acetone solution of cellulose propionate while the latter is at a temperature of about 30° C. and in an amount sufficient to effect the precipitation of a first, gel-like fraction which constitutes about 10 to 20% by weight of the cellulose propionate present in solution. Usually, the addition of the precipitant is made with stirring while the acetone solution of cellulose propionate and the precipitant are at a temperature of about 30° C., the resulting mixture being heated to 40° C. to redissolve the gel, then cooled to 30° C., and allowed to stand at said temperature for 10 to 20 hours to permit the initial, gel-like precipitate to reform. After decantation of the supernatant liquid from the initial gel-like fraction, there is added to said liquid additional aqueous-alcoholic precipitant in an amount sufficient to precipitate a second fraction constituting 70 to 80% by weight of the original cellulose propionate in solution. In contrast to the first fraction, the second fraction is of a flaky or granular structure and precipitates immediately from solution. The precipitation of the second fraction also preferably takes place at a temperature of about 30° C. The granular structure of the precipitate enables it to be filtered readily from the supernatant liquid. The third fraction comprising about 5 to 10% by weight of the cellulose propionate contains the major portion of the blush-producing material and the acetone in which said fraction is dissolved may be recovered by evaporation to dryness, the third fraction remaining behind.

The first or gel-like fraction is of little value and constitutes high molecular weight, high viscosity cellulose propionate containing various foreign materials. This fraction is characterized by the fact that, when subjected to molding operations, the molded products are of poor clarity and color. The third fraction, on the other hand, comprises low molecular weight material of low viscosity together with other impurities associated therewith. If molded, the third fraction is found to yield molded articles which are not only of poor clarity and color but also blush badly on exposure to a combination of elevated temperature and humidity. The middle fraction, however, which precipitates in flake or granular form is the most valuable fraction and yields molded products which are not only of high clarity, free from color and substantially ash-free, but which are exceedingly resistant to blushing. No blushing is observed even on exposure of molded materials molded from said middle fraction to 100% relative humidity for 72 hours at 120° F. followed by 72 more hours at 140° F. and 100% relative humidity. Such resistance to blushing is outstanding.

The composition of the aqueous-alcoholic precipitant as well as the temperature at which the precipitation is effected is highly critical if a sharp fractionation yielding the desired blush-free fraction is to be obtained. If water alone is employed as the precipitant, close control cannot be achieved since, with continued addition of water, a point is reached where the further addition of only a very small volume of water causes the precipitation of a very large proportion of the cellulose propionate in solution. When conducting the fractionation at about 30° C., for example, the same sharp change in the solubility of the cellulose propionate is observed when the precipitant comprises an aqueous solution containing even 50% by volume of ethyl alcohol. Consequently, no closely controlled fractionation may be achieved at this temperature with such alcoholic solutions since only small additions of the precipitant produce such a large change in the solubility of the cellulose propionate. The desirable as well as the undesirable fractions all precipitate at substantially the same dilution.

With a further increase in the concentration of ethyl alcohol in the aqueous-alcoholic precipitant employed, a decided change is observed in the effect of the precipitant on the solubility of the cellulose propionate in the acetone solvent. Thus, when the concentration of alcohol in the precipitant is increased so that the aqueous precipitant employed contains about 55 to 65% by volume of ethyl alcohol and precipitation is effected at about 30° C., the sharp change in the solubility of the cellulose propionate in the acetone solution, previously encountered on continued dilution, is no longer observed. With the continued addition of said specific aqueous alcoholic precipitant to the acetone solution of cellulose propionate, precipitation takes place gradually and no sharply defined solubility point is reached, whereby the further addition of but a small volume of the precipitant causes the precipitation of a large proportion of the cellulose propionate in the solution. The precipitation of an excessively large proportion of the cellulose propionate with the undesirable fractions is thus avoided and, consequently, a closely controlled fractionation may be achieved. Furthermore, the critical nature of the precipitant is clearly shown by the fact that if the volume of alcohol in the aqueous precipitant is increased above 65% by volume, a sharply defined solubility point is again observed to be reached at a temperature of about 30° C. upon continued addition of the precipitant. At this solubility point, as in the instances mentioned above, the further addition of but a relatively small volume of the precipitant will cause the precipitation of substantially all of the cellulose propionate in the acetone solution and no carefully controlled separation or fractionation is possible. Thus, it is apparent that the ratio of alcohol to water in the precipitant is quite important and small variations from the critical ratio will not yield the desired fractionation. The higher the temperature at which the fractional precipitation is effected the higher the ratio of water which can be employed in the precipitant to yield a sharply defined fraction.

In order further to illustrate my invention, but without being limited thereto, the following example is given:

*Example*

70 parts by weight of cellulose propionate having about 0.3 free hydroxyl groups therein per glucose unit are dissolved in 630 parts by weight of acetone to form a 10% by weight solution of the cellulose propionate. To the solution obtained are added 731.6 parts by weight of an aqueous solution containing 60% by volume of ethyl alcohol (2B formula) and 40% by volume of distilled water $$\left(\text{sp. gr.}\ \frac{15.5°C.}{15.5°C.}=0.918\right)$$

The mixture obtained is warmed to 40° C. with stirring and then allowed to stand for 16 hours at 30° C. A gel-like precipitate comprising 19% by weight of the original cellulose propionate in solution forms. The supernatant liquid is decanted therefrom. With the supernatant liquid at 30° C. there is now added 1800 parts by weight of the above aqueous alcoholic precipitant and a second fraction of cellulose propionate comprising about 75% of the original cellulose propionate precipitates immediately in the form of fine flakes. The precipitate is filtered from solution and dried. The third fraction is allowed to remain in solution. The solvents may be removed by evaporation leaving the third cellulose propionate fraction behind.

100 parts by weight of the dried fractionated flakes comprising the second fraction are combined with 15 parts by weight of a plasticizer therefor, such as dibutyl phthalate, and the plasticized, fractionated cellulose propionate molded into discs at 200° C. for 15 minutes. The original, unfractionated cellulose propionate is also plasticized with the same plasticizer and in the same amount, and is then molded into discs under said conditions. The discs molded of the fractionated cellulose propionate are found to be highly resistant to blushing on exposure for 72 hours to 100% relative humidity at 120° F. followed by exposure for 72 hours to 100% relative humidity at 140° F. Discs molded of the unfractionated cellulose propionate become almost opaque under these conditions and even after removal from the testing device to normal room conditions the opaque discs do not clear completely even after 2 weeks. Films prepared from the middle, flake fraction of the fractionated cellulose propionate are also highly resistant to blushing.

The cellulose propionate subjected to fractionation in accordance with my novel process may be obtained by treating cellulose with an esterifying medium comprising propionic acid, propionic anhydride and a suitable esterification catalyst, such as sulfuric acid. The esterification may be effected either with or without a pretreatment of the cellulose designed to render the same more reactive and more readily esterifiable when treated with the esterification mixture. The cellulose is entered into the esterification medium, and, after the esterification reaction is completed, the fully esterified cellulose propionate produced by said reaction is obtained in the form of a viscous, homogeneous solution. Water is added to this solution to convert any unreacted propionic anhydride remaining to propionic acid. Water or other non-solvent for the fully esterified cellulose propionate may then be added in a sufficient quantity to precipitate the cellulose tri-propionate. Where a hydrolyzed cellulose propionate is desired, an amount of water sufficient for ripening is added and the fully esterified cellulose propionate in solution is permitted to ripen whereby propionyl groups are hydrolyzed therefrom to form a cellulose propionate having the desired free hydroxyl value. The hydrolyzed cellulose propionate may then be precipitated from solution by the addition of an excess of water or other non-solvent thereto. The precipitated cellulose propionate is usually washed with water, stabilized if necessary, employing water at an elevated temperature and pressure, washed again and dried. The dried cellulose propionate is dissolved in a suitable solvent mixture, as above, and then treated to remove the blush-producing components therefrom. The treated, dried blush-free cellulose propionate may be dissolved in a suitable solvent mixture and then employed for the production of films and foils or subjected to molding operations after being suitably plasticized.

It is to be understood that the foregoing detailed description is given merely by way of illustration and that many variations may be made therein without departing from the spirit of my invention.

Having described my invention, what I desire to secure by Letters Patent is:

1. Process for the treatment of cellulose propionate to remove blush-producing components therefrom, which comprises dissolving the cellulose propionate in acetone to form a solution containing about 10% by weight of the cellulose propionate, adding an aqueous solution containing about 55 to 65% by volume of ethyl alcohol thereto to precipitate a gel-like fraction of the cellulose propionate comprising from 10 to 20% by weight of the cellulose propionate originally present, separating the gel-like fraction from the supernatant liquid, adding a further quantity of aqueous ethyl alcohol to the supernatant liquid to precipitate a flaky, granular blush-resistant fraction of the cellulose propionate from solution, and separating said blush-resistant fraction from the supernatant liquid remaining.

2. Process for the treatment of cellulose propionate to remove blush-producing components therefrom, which comprises dissolving the cellulose propionate in acetone to form a solution containing about 10% by weight of the cellulose propionate, adding an aqueous solution containing about 55 to 65% by volume of ethyl alcohol thereto while both the acetone solution and the aqueous alcoholic solution are at a temperature of about 30° C., to precipitate a gel-like fraction of the cellulose propionate comprising from 10 to 20% by weight of the cellulose propionate originally present, separating the gel-like fraction from the supernatant liquid, adding a further quantity of aqueous ethyl alcohol to the supernatant liquid to precipitate a flaky, granular blush-resistant fraction of the cellulose propionate from solution, and separating said blush-resistant fraction from the supernatant liquid remaining.

3. Process for the treatment of cellulose propionate to remove blush-producing components therefrom, which comprises dissolving the cellulose propionate in acetone to form a solution containing about 10% by weight of the cellulose propionate, adding an aqueous solution containing about 55 to 65% by volume of ethyl alcohol thereto while both the acetone solution and the aqueous alcoholic solution are at a temperature of about 30° C., heating the solution to about 40° C., cooling the solution to about 30° C. and allowing the solution to stand at said temperature to precipitate a gel-like fraction of the cellulose propionate comprising from 10 to 20% by weight of the cellulose propionate originally present, separating the gel-like fraction from the supernatant liquid, adding a further quantity of aqueous ethyl alcohol to the supernatant liquid to precipitate a flaky, granular blush-resistant fraction of the cellulose propionate from solution comprising from 70 to 80% by weight of the cellulose propionate originally present, and separating said blush-resistant fraction from the supernatant liquid remaining.

4. Process for the treatment of cellulose propionate to remove blush-producing components therefrom, which comprises dissolving the cellulose propionate in acetone to form a solution containing about 10% by weight of the cellulose propionate, adding an aqueous solution containing about 60% by volume of ethyl alcohol thereto with stirring while both the acetone solution and the aqueous alcoholic solution are at a temperature of about 30° C., heating the solution to about 40° C., cooling the solution to about 30° C. and allowing the solution to stand at said temperature for 10 to 20 hours to precipitate a gel-like fraction of the cellulose propionate comprising about 10 to 20% by weight of the cellulose propionate originally present, separating the gel-like fraction from the supernatant liquid, adding a further quantity of aqueous ethyl alcohol to the supernatant liquid to precipitate a flaky, granular blush-resistant fraction of the cellulose propionate from solution comprising from 70 to 80% by weight of the cellulose propionate originally present, and separating said blush-resistant fraction from the supernatant liquid remaining.

WALTER D. PAIST.

REFERENCES CITED

The following references are of record in the file of this patent:

UNITED STATES PATENTS

| Number | Name | Date |
|---|---|---|
| 1,959,446 | Scheidegger | May 22, 1934 |
| 2,372,565 | Fothergill | Mar. 27, 1945 |
| 2,414,869 | Haney | Jan. 28, 1947 |

OTHER REFERENCES

Morey et al.; J. Phys. Chem., vol. 50, Jan. 1946, pages 12–22.

Ohl, Kunstseide, vol. 12, 1930, pages 468–472.

Herzog et al.; Cellusechemie, vol. 13, 1932, pages 25–31.

Sookne et al.; J. Res. Nat. Bureau of Standards, vol. 29, pgs. 123–130.

McNally et al.; Journal Am. Chem. Soc. 1929, pp. 3095–3101.